(12) United States Patent
Jacobsen et al.

(10) Patent No.: US 6,533,500 B1
(45) Date of Patent: Mar. 18, 2003

(54) METHOD FOR REDUCING FRICTIONAL LOSSES IN TUNNELS

(75) Inventors: Tom Jacobsen, Trondheim (NO); Lars Jenssen, Trondheim (NO)

(73) Assignee: Leiv Eiriksson Nyfotek AS, Trondheim (NO)

( * ) Notice: Subject to any disclaimer, the term of this patent is extended or adjusted under 35 U.S.C. 154(b) by 0 days.

(21) Appl. No.: 09/869,217

(22) PCT Filed: Dec. 13, 1999

(86) PCT No.: PCT/NO99/00376

§ 371 (c)(1),
(2), (4) Date: Oct. 4, 2001

(87) PCT Pub. No.: WO00/40836

PCT Pub. Date: Jul. 13, 2000

(30) Foreign Application Priority Data

Dec. 30, 1998 (NO) ................................................. 986193

(51) Int. Cl.⁷ .............................. E21D 11/00; F15C 1/00
(52) U.S. Cl. ....................... 405/150.1; 137/833; 138/39
(58) Field of Search ............................. 137/10, 12, 14, 137/803, 833; 405/150.1, 154.1, 157, 184.2, 184.1, 77, 88; 138/26, 37, 39, 44, 111–114

(56) References Cited

U.S. PATENT DOCUMENTS

| | | | | |
|---|---|---|---|---|
| 3,955,362 A | * | 5/1976 | Jones et al. | 123/211 |
| 4,064,211 A | * | 12/1977 | Wood | 138/140 |
| 4,616,955 A | * | 10/1986 | Wallace et al. | 405/154.1 |
| 4,846,228 A | * | 7/1989 | Blanscet | 138/26 |
| 5,180,253 A | * | 1/1993 | Siegfried et al. | 405/146 |
| 5,209,265 A | * | 5/1993 | Taguri et al. | 138/40 |

FOREIGN PATENT DOCUMENTS

| | | | |
|---|---|---|---|
| GB | 2045835 | * | 11/1980 |
| GB | 2087456 | * | 5/1982 |
| GB | 2088516 | * | 6/1982 |

* cited by examiner

Primary Examiner—Thomas B. Will
Assistant Examiner—Tara L. Mayo
(74) Attorney, Agent, or Firm—Alix, Yale & Ristas, LLP

(57) ABSTRACT

A method for reducing frictional loss in unlined tunnels or other tunnels with a rough wall surface and/or irregular cross section. A flexible or rigid pipe with a cross section similar to or somewhat less than the largest circular open cross section of the tunnel is introduced into the tunnel and attached continuously or at certain points to parts of the tunnel wall. Apparatus for ensuring that a superpressure occurs within the pipe relative to its outside during flow are also introduced.

10 Claims, 3 Drawing Sheets

METHOD FOR REDUCING FRICTIONAL LOSSES IN TUNNELS

CROSS REFERENCE TO RELATED APPLICATIONS

This is the national phase of International Application No. PCT/NO99/00376 filed Dec. 13, 1999.

BACKGROUND OF THE INVENTION

Tunnels for hydroelectric power stations are used to convey water from a reservoir or an inlet to a power plant, so the potential energy of the water is transformed to electric energy. When the water is flowing though a tunnel, an energy loss induced by friction will always arise. As some of the potential energy is lost, the obtained energy is less than the theoretically obtainable energy. Society has a large and continually increasing energy consumption, leading to a steady requirement of new power plants and consequential environmental damage. It is evident therefore that if energy losses can be minimized then this has a significant advantage for the environment and society.

A lot of tunnels e.g. in Norway are simply mined out with no concrete linings or the like, with the exception of concrete reinforcement of especially weak zones. As the water flows close to the very rough tunnel wall surface in such tunnels, the frictional loss is much larger than it would have been following a smoother surface.

Older tunnels with a relatively small cross section will have a larger head loss compared to newer tunnels. The reason may be that these older towels were dimensioned according to outdated criteria (higher financial interest, higher construction costs and less value of the power) compared to the situation today.

Further, in some situations it will be desirable to increase the water flow through the tunnel, e g. by increasing the power plant's maximum discharge and/or conveying more water to the power plant, which leads to a disproportionately large head loss.

When constructing new tunnels the head loss is reduced by drilling or mining with a cross section sufficiently large and with a smoothest possible surface. In addition the loss is sometimes reduced by means of smoothing the sole of the tunnel with asphalt or the like. These methods however have technical and economical limitations which result in a head loss that is still significant in most tunnels. If a significant flow increase has been required for a power plant, making a new tunnel parallel with the existing one or providing an enlargement of the existing one, has up until now been the practical solution of such a requirement. Both these solutions involve significant construction costs.

SUMMARY OF THE INVENTION

The objective with the present invention is to reduce the frictional loss that appears when water flows through unlined tunnels or other rough walled tunnels. It is a further objective to achieve this with means that are economical, easy to install and which require a minimum of maintenance. Thus, the invention will constitute a method that can contribute to the upgrading of existing power plants close to their maximum theoretical performance, such that unnecessary extensive new constructions of hydroelectric power plants are avoided.

According to a preferred embodiment an entire length of a pipe may be pre-fabricated from a flexible material as one integral, cylindrical unit, tailor-made for the relevant tunnel. This gives the evident benefit that any joining/assembling of different pieces is avoided. A possible disadvantage is that the weight of the pipe may be excessive. A ductile and preferably reinforced fabric may be utilized, like the ones used for oil booms.

With regard to the problems connected with large dimensions and heavy weight, it may, in some connections, be preferred to assemble the pipe from sections of the flexible fabric, prefabricated in suitable length sections. The sections may be pre-shaped in a cylindrical form which are joined section by section to the appropriate length by suitable means, like welding. Alternatively, the sections may be rectangular, in which case one or more rectangular pieces may be first joined (welded) to a cylindrical unit, where after subsequent cylindrical units are attached to one another.

The dimensions are chosen such that when the completed pipe by means of superpressure obtains its intended and nearly cylindrical shape, the pipe fills nearly entirely the regular (cylindrical) part of the tunnel. It is evident that there will be some void between the pipe and the tunnel wall, varying in shape and dimensions depending on the variations of the rough tunnel wall surface. By preferred embodiments which will be described in further detail, this void is also utilized for conveying a limited flow of water, while at the same time maintaining an appropriate superpressure within the pipe so that the pipe is held expanded (cylindrical) during all normal operating conditions.

The tension on the pipe daring normal operation is significant, and it is necessary to prevent the pipe from being displaced in the longitudinal direction of the tunnel by attaching it to the tunnel wall, either at certain intervals or continuously. Tension due to pressure fluctuations however, is avoided, as the (super) pressure within the pipe at all times will he higher than the pressure outside.

BRIEF DESCRIPTION OF THE DRAWINGS

In the following the invention is described in further detail with reference to the accompanying drawings, where:

FIG. 2b is an enlarged view of the tunnel, rail, pipe, and attachment unit of FIG. 2a;

FIGS. 5b–5d illustrate methods of maintaining a superpressure within the pipe of FIG. 5a.

DETAILED DESCRIPTION OF THE PREFERRED EMBODIMENT

Figure 1:
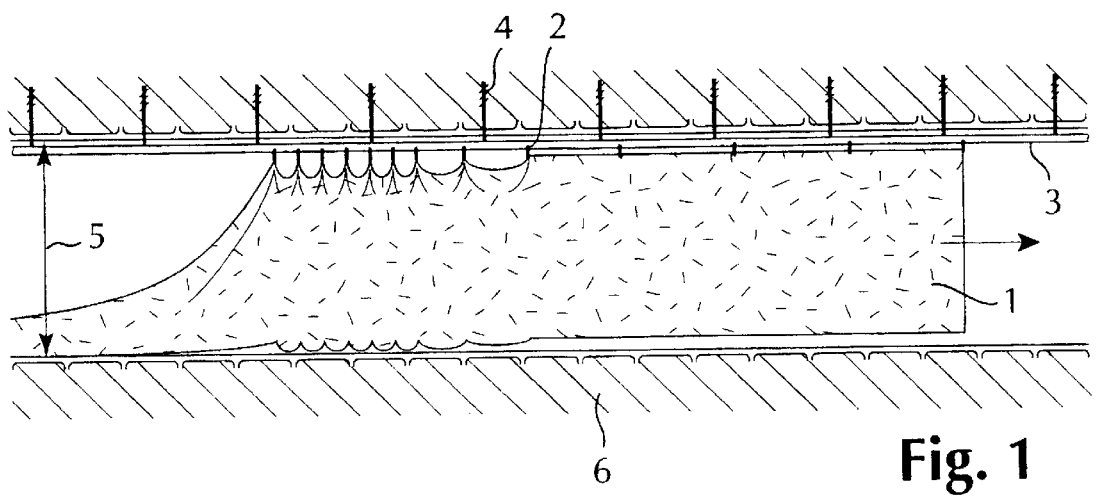
FIG. 1 is a longitudinal section view of a tunnel having a first embodiment of pipe in accordance with the invention mounted therein.

FIG. 1 shows a longitudinal section of a tunnel in which the invention is being assembled in the form of a cylindrical, flexible fabric 1 in one piece. By means of attachment units 2 the fabric 1 is attached with even intervals along a straight line on the periphery of the fabric to a rail (bar) 3 extending centrally along the "ceiling" of the tunnel, i.e. at or close to the highest point of the cross section 5 of the tunnel. The rail 3 for its part is attached to the tunnel wall 6 by means of bolts 4 or similar attachment means A particular advantage with this attachment arrangement is that the rail 3 carries most of the weight of the fabric right from the start of the assembly, as the attachments 2 on the fabric 1 (or pipe) are pushed over the rail at the tunnel opening and from there guided to correct positions in the tunnel without much force being required for lifting or the like within the tunnel.

Figure 2A:
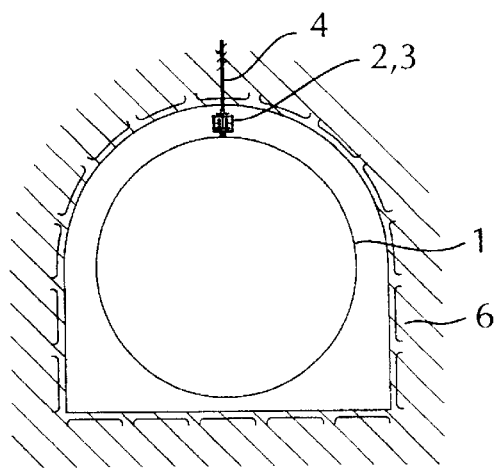
FIG. 2a is a cross section view of the tunnel of FIG. 1.
Figure 2B:
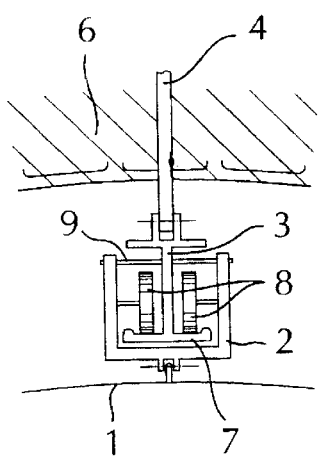

FIG. 2 shows the same tunnel as FIG. 1, but in a cross section view of the tunnel. As already indicated, this kind of attachment may be used also if the pipe is made of more rigid pipe elements so the pipe 1 on FIG. 2 can symbolize either a flexible or a rigid pipe.

When the fabric or pipe is correctly positioned, it can be fixed relative to the tunnel wall so that it can only move minimally in the longitudinal direction of the tunnel. The detailed drawing 2b shows a preferred embodiment for an attachment unit 2 and the rail 3, where the attachment unit 2 comprises at least one wheel 8 arranged to run along the lower part of the rail 3, as well as a locking pin 9 or bolt so arranged that it may be pushed through holes in a first vertical flange of the attachment unit 2, thereafter through a hole in the rail 3 and finally screwed into a threaded opening in a second vertical flange of the attachment unit 2. In this way, the attachment unit 2 will no longer be able to move along the rail once it has been positioned and the locking pin has been secured.

Figure 3:
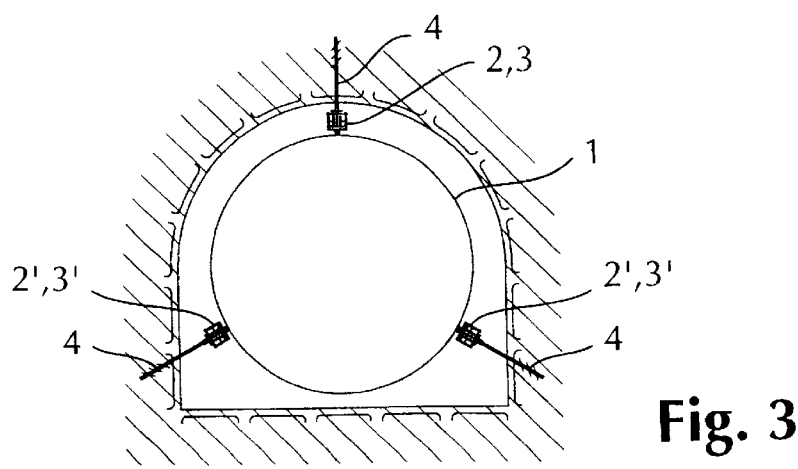
FIG. 3 is a cross section view of an alternative mounting arrangement for the embodiment of FIG. 1.

It is of course possible to utilize more than one rail if required to hold the pipe sufficiently steady. As shown in FIG. 3, three rails have been utilized, spaced mutually 120° apart seen in a cross section of the tunnel, so that they are evenly spaced around the periphery. This gives a particularly secure attachment once the pipe is finally fixed. On the other hand, it requires a lot of additional work to provide additional attachments and this work will only be taken on when it is required. It is also possible to use a rail along the top line of the tunnel and other more flexible or versatile attachment arrangements for the other attachment points 2'. Thus the attachment mechanism 3' may be a rail, but also attachment straps or the like may be used that are not necessary arranged as evenly or close together as the attachment units 2 along the ceiling of the tunnel.

The attachment units 2 on the fabric or pipe can be of any one kind able to hold the tension required. It is, however, preferred with respect to the required strength to use attachment ears that are formed integrally with the fabric or the pipe.

Even though the rail described constitutes a particularly convenient way to fix the pipe to the tunnel wall, due to the convenient installation procedure it offers, the invention is not limited to any particular way of arranging the attachment. Any known means for attachment, including rigid bolts and flexible straps, or combinations of such means, shall be considered to fall within the scope of the invention. It is hereby understood that it is neither required that the attachment points be arranged in a line, even though this often is most convenient.

It will be understood that use of a flexible fabric offers many advantages in connection with the assembly. In addition to the small space required for transportation, there will always be room for a worker between the fabric and the tunnel wall, e.g. in connection with the attachment, as the fabric easily may be bent aside where the space between the tunnel wall and the pipe is else to small.

Another aspect is that if the tunnel has certain abnormal irregularities from a mainly regular cylindrical shape, it is easier to adapt special solutions with a flexible pipe than with a rigid one, so that a single narrow point in the tunnel does not require the entire pipe to be narrowed.

In other situations it may be favorable to utilize a pipe constituting more rigid pipe elements put together to form a generally rigid pipe structure as shown in FIG. 4. The advantage is that the assembled construction will have less ability to move, it requires fewer attachment points to the tunnel wall, and it will not collapse if it is emptied. On the other hand it will lack the particular advantages of the flexible pipe as already described. The rigid pipe will need to be fixed to the tunnel wall, which principally will be achieved the same way as for the flexible pipe.

Figure 4A:
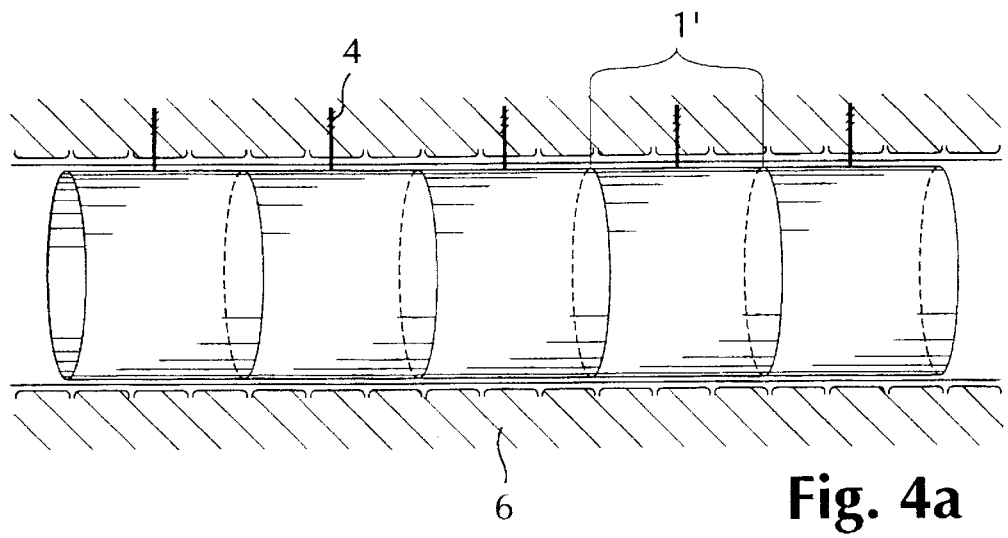
FIG. 4a is a longitudinal section view of a tunnel having a second embodiment of pipe in accordance with the invention mounted therein.
Figure 4B:
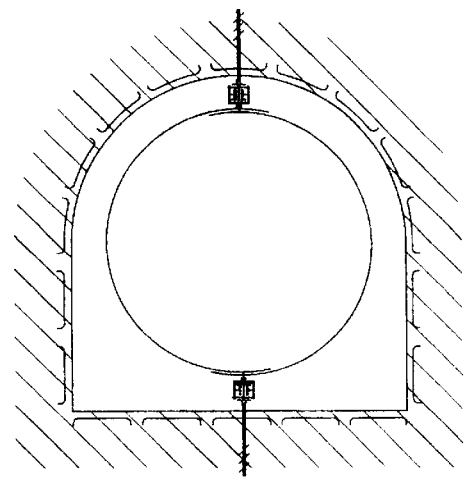
FIG. 4b is a cross section view of the tunnel of FIG. 4b.

The rigid pipe elements can have the form of cylinder elements 1' as indicated in FIG. 4a, but it will often be more practical with elements constituting only part, e.g. half, of a cylinder wall, cf. FIG. 4b. This is due to the space required for transportation and problems relative to bringing the elements into the tunnel and having them assembled and fixed at the right location under limited space. For sheets constituting only part of the cylinder wall, there are again different embodiments. Such elements can have the form of curved plates of a very rigid structure that can alter shape only to a very limited degree, or have the form of very thin-walled sheets which have the ability to bend at least in one direction and which in unconstrained form take a flat, rectangular shape. Once a sheet of this latter category has been bent to desired cylindrical shape and assembled with neighboring sheets an both sides, its freedom to move is very constrained as it is part of a rigid wall structure.

A general problem related to use of such pipes in a tunnel, especially when made of a flexible fabric, is that pressure surges will occur in the pipe from time to time. The pipe must be able to withstand such surges without collapsing. In the following several ways to deal with this problem are described, all of them sharing the common feature of building and maintaining a certain superpressure within the pipe compared to the pressure outside.

Figure 5A:
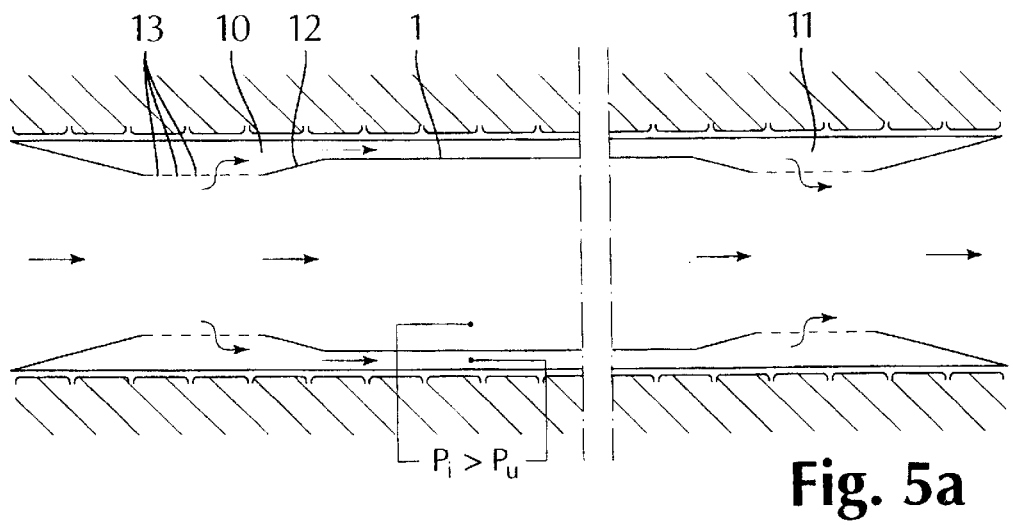
FIG. 5a is longitudinal section view of a tunnel having the first embodiment of the pipe and first and second narrow passes installed therein.

The most preferred way to obtain such a superpressure is shown in FIG. 5a, and involves establishing a permanent narrow pass 10 short upstream of the pipe 1 entrance, e.g. made in metal or concrete which, immediately upstream of the pipe, again is extended to the cross section of the pipe by means of a smooth and even conus 12 that ensures that the flow past the narrow pass takes place with a minimum of turbulence. In addition, openings 13 through the wall of the narrow pass allow a certain amount of water to pass from its inside to its outside, and from there flows along the outside of the pipe, between the tunnel wall and the pipe. The main volume of water, however, will flow past the narrow pass 10 and into the pipe 1, and the velocity of this flow will be higher at the narrow pass than within the pipe.

As the water flows past the narrowest cross section and through the conus shaped part 12 of the narrow pass enters the pipe, the velocity will decrease somewhat, which means that some of its kinetic energy will be transformed into pressure energy, which again means that the pressure within the pipe will be somewhat higher than outside. The degree of narrowing determines how much higher this pressure will be. This construction can be adapted with regard to the needs in each relevant case. It should be noted that it is convenient or necessary that superpressure can be maintained for flow in both directions, due to the fluctuations that may occur when turbines are adjusted. Further the superpressure should be obtainable for a variety of water velocities, up to the velocity when the turbines are raced (approximately twice the normal velocity).

In order to be able to maintain the superpressure during backflow of water, a similar narrow pass 11 can be used downstream of the pipe as the one 12 upstream. The water velocity outside the pipe will automatically adapt so that the head loss is equal on the inside and the outside. In practical terms, this means that the velocity will be much lower outside than inside the pipe but the outside space at least gives a certain contribution to the total flow.

Figure 5B:
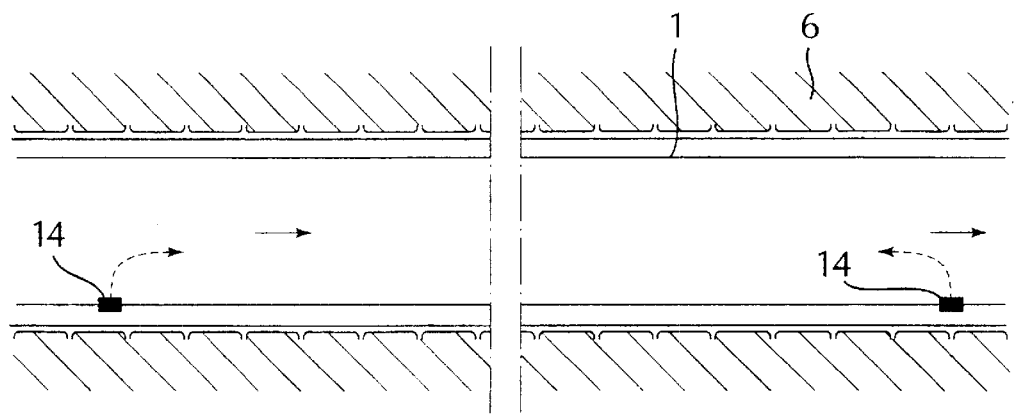

There are, however, other ways to provide the superpressure within the pipe that is required according to the invention. One alternative is to arrange pumps 14 upstream and downstream of the pipe, cf. FIG. 5b, both of which are directed to pump into the pipe (dotted lines indicates direction of pumping), which means that the pump downstream of the pipe pumps in counterflow to the general flow direction. This arrangement provides a local superpressure between the pumps. The disadvantage with this solution is that it depends on mechanical movable parts, which requires energy supply to work.

Figure 5C:
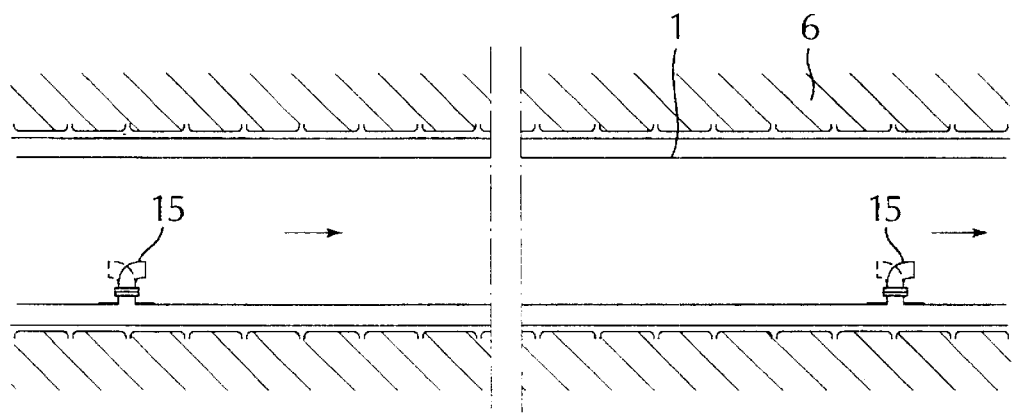

A further alternative embodiment is shown in FIG. 5c, which consists of arranging small tubings 15 at the inlet and outlet end of the pipe. One end of each of the tubings 15 are led generally perpendicularly through the wall of the pipe 1, and may be rotatably shafted to the pipe 1. If the ability to reverse the water flow is not required, the tubings need not be rotatably shafted. The tubings are substantially less in cross section than the pipe 1 according to the invention. The tubings are bent approximately 90°, so their free ends are mainly parallel with the flow direction within the pipe 1. Due to the forces that the water flow imposes on the tubings, they will adjust so they point in the flow direction. Immediately downstream of the tubings, there will be a relative subpressure, which will be conveyed to the outside of the pipe through the tubing 15.

The most elegant and reliable way of providing a local superpressure consists of the narrow pass described with reference to FIG. 5a. Some variants of this embodiment may be introduced depending upon the circumstances. By the first described alternative it was suggested that a minor flow of water should be permitted on the outside of the pipe. In cases of long tunnels it may be desired to apply more than two narrow passes spaced apart conveniently, in order to control the superpressure at different regions in the tunnel. It is possible to use only one narrow pass if it is required to maintain a superpressure in a pipe of limited length. According to this alternative, there will not be any flow outside the pipe.

Figure 5D:
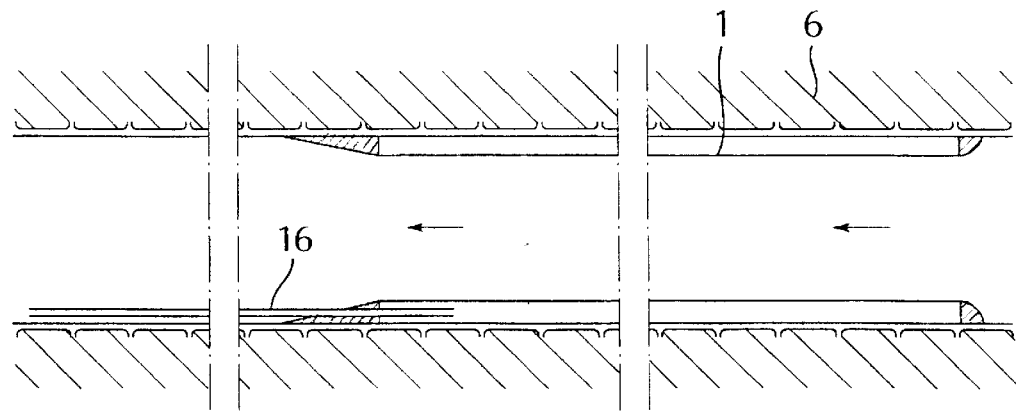

If the water flow is always unidirectional, the void outside the pipe may be connected to a point of lower pressure further downstream by means of a small pipe conduit 16, as shown in FIG. 5d, so that a relative superpressure is obtained within the pipe (Note that on FIG. 5d, the flow direction is from right to left).

Irrespective of whether the pipe material constitutes rigid plates or a flexible fabric, the surface of the pipe, and especially the side facing inwards, should be as smooth and frictionless as possible. This is primarily a question of choice of material and surface treatment of the same prior to assembly in the tunnel. It may also be relevant to treat the material in certain ways, e.g. in order to prevent growth of fungus or the like. This is however, a secondary consideration in relation to the core of the invention, which is to arrange a pipe-shaped body with a very consistent and even shape and preferably an approximately circumferential cross section in the tunnel. Even though the cross section always will be somewhat less than the cross section of the tunnel itself, a lot of energy will be saved in terms of reduced frictional loss.

EXAMPLE

In the following a calculation example is given, indicating the magnitude of saving obtainable by the method according to the invention. The example takes as a basis a 50 m² tunnel conveying 150 m³ water per second. The example shows that approximately ¾ of the fictional loss may be avoided by use of the invention. As the example also shows, the savings are larger where there is a need to increase the flow compared to what the tunnel was originally dimensioned for. For a water flow of 100 m³ per second, the saving will be 2.7 Gwh/km tunnel, while at 120 m³ per second, the saving will be 4.7 Gwh/km tunnel. (1 Gwh corresponds to the yearly energy consumption of approximately 40 ordinary detached houses in Norway).

What is claimed is:

1. A method for reducing frictional loss in tunnels carrying a fluid flow, the tunnel defining upstream and downstream directions and inlet and outlet ends and having a wall defining a cross section width, the wall having a texture, the method comprising the steps of:

introducing a pipe into the tunnel, the pipe having a cross section width which is equal to or somewhat less than the largest cross section width of the tunnel, attaching at least a plurality of points of the pipe to the tunnel wall, and producing a superpressure in the pipe relative to the pipe exterior during flow.

2. The method according to claim 1, further comprising the step of forming the pipe from a flexible fabric having a surface, the surface having a texture which is smoother than the texture of the wall of the tunnel.

3. The method according to claim 1, further comprising the step of assembling the pipe from a plurality of rigid, thin-walled pipe elements to form a substantially rigid structure.

4. The method according to claim 1 in that the step of producing a superpressure comprises the sub-step of introducing a first permanent narrow pass in the tunnel upstream of the inlet end of the pipe, the first narrow pass having a downstream portion having a cross section width which is less than the cross section width of the pipe and an upstream portion having a cross section width which increases from the cross section width of the downstream portion to the cross section width of the pipe, wherein the flow velocity will gradually decrease in the downstream portion of the narrow pass and some of the kinetic energy is transformed into pressure energy.

5. The method according to claim 4, further comprising the sub-step of maintaining a flow of the fluid intermediate the pipe and the tunnel by introducing a second narrow pass downstream of the pipe.

6. The method according to claim 4, wherein the cross section widths of the downstream and upstream portions of the first narrow pass are selected such that the first narrow pass does not produce pressure fluctuations which create dynamic tensions.

7. The method according to claim 4, further comprising the step of diverting a portion of the fluid flow to the outside of the pipe through a plurality of openings which extend through the first narrow pass.

8. The method according to claim 1, wherein the pipe is attached to the tunnel wall by a plurality of attachment units mounted on the pipe, all of the attachment units being attached to a single rail secured to an upper part of the tunnel wall.

9. The method according to claim 8, wherein the attachment units are moveable along said rail during assembly and disassembly and are lockable to distinct positions along the rail.

10. The method according to claim 8, wherein the pipe is formed of a flexible material which is held extended with a substantially circular cross section.

\* \* \* \* \*